United States Patent

Rumbaugh

[15] 3,653,141

[45] Apr. 4, 1972

[54] FISHING REEL MOUNT

[72] Inventor: James T. Rumbaugh, Spirit Lake, Iowa

[73] Assignee: Berkley & Company, Inc., Spirit Lake, Iowa

[22] Filed: Jan. 30, 1970

[21] Appl. No.: 7,111

[52] U.S. Cl. ................................................43/22
[51] Int. Cl. ........................................A01k 87/06
[58] Field of Search.....................................43/22

[56] References Cited

UNITED STATES PATENTS

| 2,926,450 | 3/1960 | Ritchie | 43/22 |
| 3,315,912 | 4/1967 | Balaguer | 43/22 |

FOREIGN PATENTS OR APPLICATIONS

| 772,886 | 4/1957 | Great Britain | 43/22 |
| 183,277 | 7/1922 | Great Britain | 43/22 |

*Primary Examiner*—Samuel Koren
*Assistant Examiner*—Daniel J. Leach
*Attorney*—Orrin M. Haugen

[57] ABSTRACT

In combination with fishing reel means for dispensing and rewinding fishing line and having winding handle means for actuation thereof; a mounting foot means comprising a mounting shank portion with shoe means extending generally transversely of said mounting shank portion disposed at one end thereof, the shoe means preferably having generally symmetrical end portions for attaching to the reel mounting portion of a fishing rod handle, the mounting shank portion and said shoe means presenting an asymmetrical disposition for said reel attaching means along the axial extent of said reel-mounting portion to control the axial disposition of said reel along said fishing rod handle, and reel-attaching means adjacent the opposed end of said mounting shank portion having means for mounting the reel on the foot while the foot is in either axial disposition, such as by providing mounting means on opposed faces with each face being adapted to receive a reel. Means are also provided for controlling the "tilt" of the reel relative to the shoe portion of the mounting foot.

15 Claims, 12 Drawing Figures

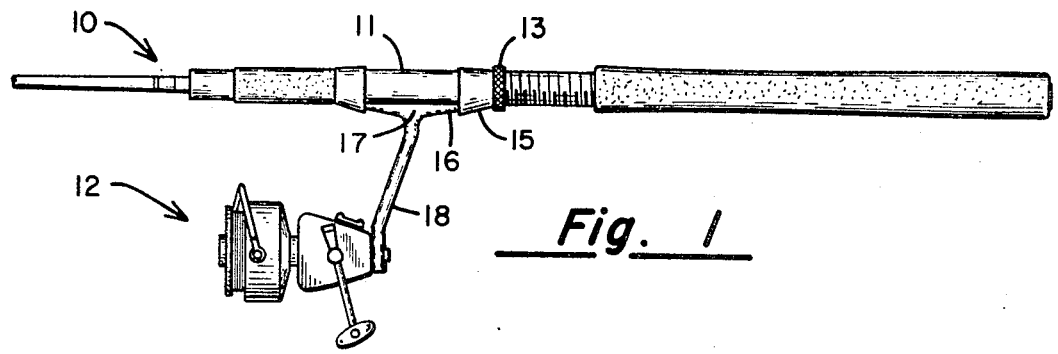
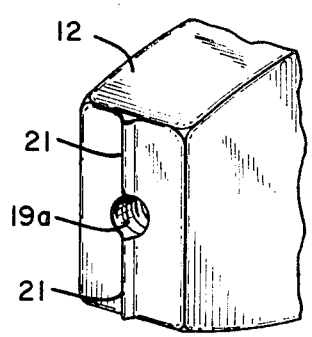
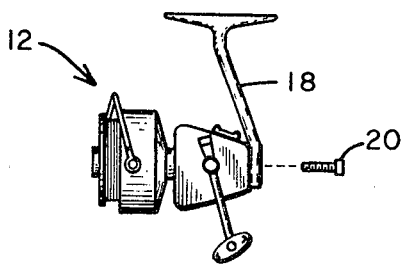
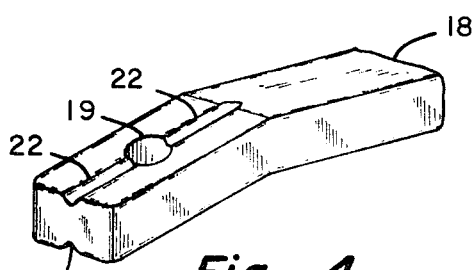
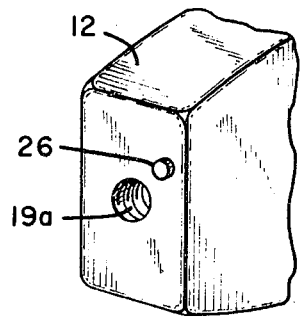
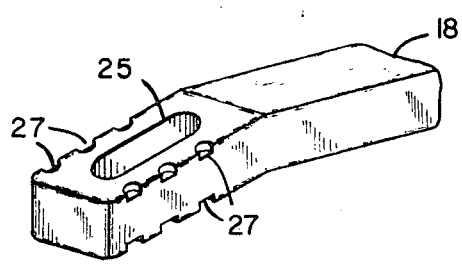
INVENTOR
JAMES T. RUMBAUGH

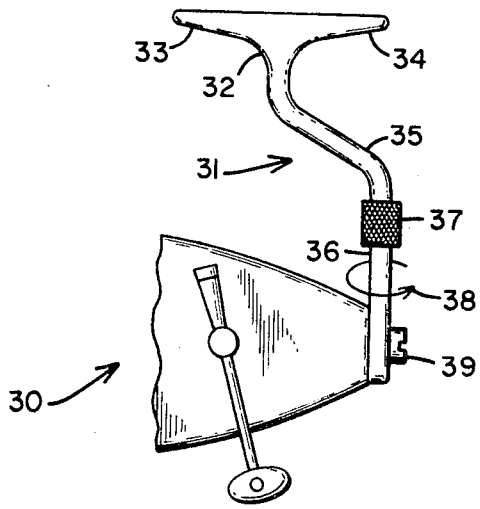
Fig. 7
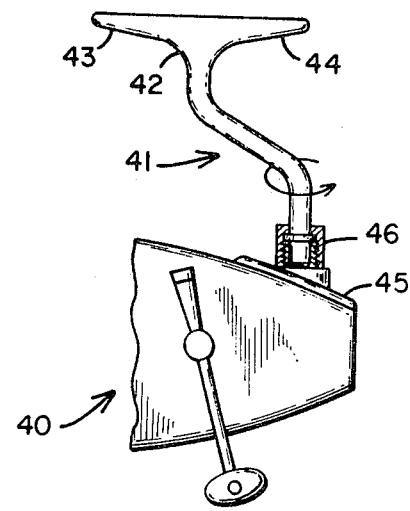
Fig. 8
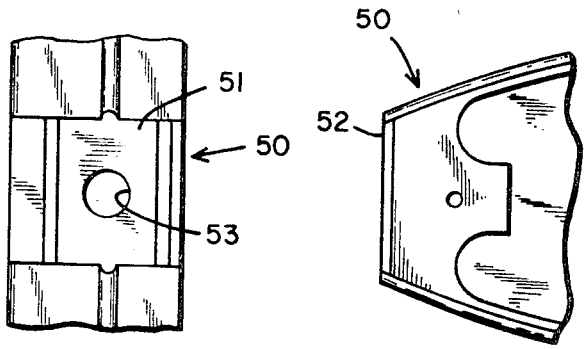
Fig. 10
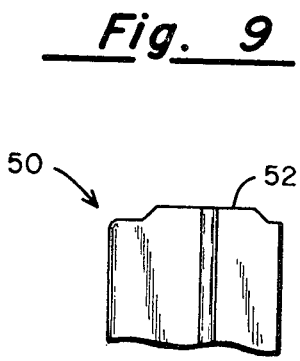
Fig. 9
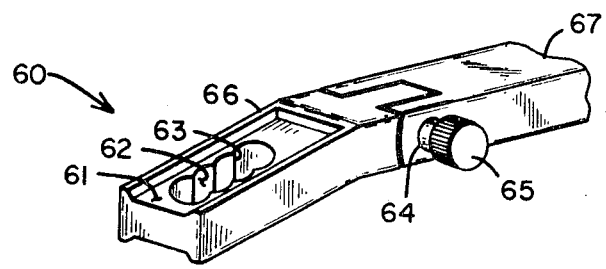
Fig. 12
Fig. 11
INVENTOR
JAMES T. RUMBAUGH
BY  *Chris M. Haugen*
ATTORNEY

FISHING REEL MOUNT

The present invention relates generally to an arrangement for mounting a fishing reel such as a spinning reel on a fishing rod, and more particularly to a system for controlling the axial disposition and elevation of a spinning reel along the fishing rod, the axial disposition providing a measure of balance for the overall combination, the elevation providing both convenience and comfort to the user. The arrangement facilitates pre-selection of a more desirable mounting location for the reel on the fishing rod, this mounting location being selected at a desirable balance and gripping point without sacrificing the mechanical aspects of the mounting arrangement. Furthermore, the center of gravity of the combined rod and reel can be adjusted so as to substantially coincide with the balance point of the handle, and also the user is provided with additional versatility in his selection of a reel mounting point to meet a desirable gripping area of the rod for a variety of uses. Thus, as a fisherman shifts from extremely lightweight tackle to heavy tackle, he may wish to adjust the mounting point of the reel in order to have the system remain in balance while compensating for the change in lure weight. The adjustment in height or elevation is of value in that the user may select a position which is comfortable and convenient for his hand size, and also for convenient manipulation of the reel mechanism.

Frequently, a fisherman will grip the rod handle at a point wherein his fingers straddle the shank of the mounting foot. If the user is not accustomed to this type of activity, he frequently may develop blisters on his fingers where contact is made with the reel foot. The present concept permits a more convenient selection of mounting disposition, wherein the user's hand may be kept away from contact with the metal or other material of the foot.

At the present time, it is conventional for spinning reels to be equipped with an attached or integral reel foot or handle which determines and fixes the disposition of the reel along the axial extent of a given rod handle. Rod designs vary widely, and once a rod is selected, the reel is attached to the rod at an axial location determined primarily by the configuration of the reel foot. Thus, while the rod and reel combination may be appropriately balanced when the reel is attached to a certain limited number of fishing rod structures, it will be virtually impossible for the reel with a fixed mounting foot to provide desirable balance for wide varieties of rod structures. In addition, available fishing rod structures are provided with a variety of different gripping handle areas and the reel designed with a fixed mounting foot may provide for mounting at certain axial locations along the rod which may compel the user to grip the handle in an unusual or awkward fashion. Most fishing rods are provided with gripping handles permitting the user to grasp the handle at certain predetermined locations, however with the wide variety of reel foot structures being available, it is impossible for a given fishing rod handle to universally accommodate the reels at desirable axial dispositions. It is generally recognized that the various rod manufacturers each provide a distinct and different balancing and handle arrangement for their products, this providing for the wide variety of rod structures in use today. In accordance with the present invention, however, it is possible to provide a fishing reel which may be mounted on a fishing rod handle at alternate axial locations, thereby enhancing the probability of achieving a reasonable balance for the overall combination or structure, when in use, the preferred gripping location being such that the thumb and forefinger rest at substantially the balance point of the structure.

Briefly, in accordance with the present invention, a mounting foot means is provided for fishing reels, preferably spinning reels, wherein the shank portion of the mounting foot means is provided with shoe means extending generally transversely of the mounting shank, the shoe means preferably having generally symmetrical end portions for attachment to the mounting segment of a fishing rod handle, with reel-mounting means being disposed adjacent the opposed end of the shank portion for attaching directly to the body of a fishing reel. The attachment means on the mounting foot is preferably adapted for coupling to the reel body centrally along the rear surface. This feature enhances the versatility of the mounting foot in that the structure renders it possible to mount a fishing reel for either left-hand or right-hand actuation by merely rotating the body of the reel 180° about its central axis from one mounting disposition to the other. It will be appreciated that other mounting locations may be utilized and the 180° rotation still being achieved. In order to exercise control over the axial disposition of the reel on the rod, the mounting shank portion has a segment angularly offset at an acute angle from the mounting shoe means, and depending upon the disposition of the mounting shank, the reel is either located forwardly or rearwardly of the shoe means. Thus, both balance and ease of grasping and holding the structure are achieved.

A plurality of replaceable interchangeable mounting feet or handles of varying degrees of "pitch" may be utilized to permit balancing of a given reel to any of a wide variety of specific rods. Therefore, it will be possible to pre-select the mounting foot to provide a mounting point for the reel on the rod so as to enhance or optimize the balance and comfort. In addition, the foot may be provided with an adjustment to mount the reel at a predetermined height distance or elevation from the handle, thus permitting use by fishermen with varying size fingers and knuckles. This arrangement also insures that the user may grip the rod at a point where his gripping hand may manipulate portions of the reel, while also insuring that the motion of the reel at the forward end is substantially unencumbered.

Therefore, it is a primary object of the present invention to provide an interchangeable mounting foot for securing fishing reels to fishing rods, the arrangement providing for the selection of alternate mounting points whereby the center of gravity for the composite rod, reel, and lure or bait structure can be adjusted to substantially coincide with the balance point.

It is yet a further object of the present invention to provide an improved foot for mounting of a spinning reel onto a fishing rod wherein the user may mount the reel at a predetermined point along the rod which facilitates gripping the rod at a desirable location.

It is yet a further object of the present invention to provide an improved single mounting foot for mounting spinning reels onto fishing rods wherein the reel may be mounted so as to permit the alternative of either right-hand or left-hand cranking.

It is yet a further object of the present invention to provide a mounting foot for attaching fishing reels onto fishing rods which permits varying adjustments of the height or elevation spacing between the reel and the rod.

It is yet a further object of the present invention to provide a mounting foot for attaching fishing reels onto fishing rods which permits varying adjustments of the height or elevation spacing between the reel and the rod.

It is still a further object of the present invention to provide an improved foot means for mounting a spinning reel onto a fishing rod wherein the mechanical motion at the forward end of the reel is substantially unencumbered.

Other and further objects of the present invention will become apparent to those skilled in the art upon a study of the following specification, appended claims, and accompanying drawings wherein:

FIG. 1 is a detail elevational view showing a spinning reel mounted on a fishing rod handle utilizing a mounting foot prepared in accordance with the present invention;

FIG. 2 is an elevational view of a spinning reel attached to a mounting foot prepared in accordance with the present invention, with the foot being rotated about its axis 180° from the disposition shown in FIG. 1;

FIG. 3 is a detail perspective view on an enlarged scale of the rear surface of a spinning reel designed to receive the mounting foot of the present invention;

FIG. 4 is a detail perspective view on an enlarged scale of the reel-attaching means of the mounting foot shown in FIGS. 1–3;

FIG. 5 is a detail perspective view on an enlarged scale of a mounting foot prepared in accordance with the present invention, and adapted for the adjustment of the elevation of the reel from the rod handle;

FIG. 6 is a detail perspective view of the rear surface of a reel adapted to receive the mounting foot means illustrated in FIG. 5; FIG. 6 being to the same scale as FIG. 5;

FIG. 7 is an elevational view of a somewhat modified form of mounting foot prepared in accordance with the present invention;

FIG. 8 is an elevational view of a spinning reel and mounting foot mechanism prepared in accordance with a still further modification of the present invention; and FIG. 9 is a detail elevational view, partially broken away, showing the rear mounting surface of a spinning reel adapted for use in connection with the present invention;

FIG. 10 is a detail side elevational view, partially broken away, of the structure shown in FIG. 9;

FIG. 11 is a detail top plan view of the rear surface of the reel shown in FIG. 9; and FIG. 12 is a detail perspective view on an enlarged scale of a mounting foot prepared in accordance with the present invention, and adapted for the adjustment of the elevation of the reel from the rod handle.

In accordance with one preferred modification of the present invention, and with particular attention being directed to FIGS. 1-4 of the drawings, the rod generally designated 10 has a reel mounting and handle portion or segment 11 upon which the reel generally designated 12 is received. Reel 12 is preferably a spinning-type reel with a conventional winding handle, line-receiving spool, and bail and line-winding means. A conventional knurled nut 13 is employed along the periphery of the mounting and handle portion 11 so as to force the foot-gripping sleeve 15 to engage and secure the tang 16 of the mounting shoe portion 17 of reel-mounting foot 18. The forward tang of the shoe 17 is received within a bore or cavity formed in the handle 11 as is conventional in the fishing rod art.

With attention now being directed to FIG. 2 of the drawings, wherein the mounting foot is rotated about its axis 180° from the disposition of FIG. 1, a mounting screw such as the screw 20 is accommodated in a bore 19 formed in the reel-mounting surface portion of foot 18, and thence into a threaded bore 19a formed in the rear of the reel 12 (see FIG. 3). This area of the mounting foot, which is at the end opposed from the shoe portion, comprises the reel-mounting means of the structure. This simple expedient completes the mounting, and, as indicated, secures the reel to the handle in the disposition shown in either FIGS. 1 or 2. The same mounting technique is employed when the reel is rotated about its axis to accommodate right-hand manipulation of the reel 12. For example, in the disposition shown in FIG. 1, the structure is designed for left-hand manipulation, and by rotating the reel member 12 by 180° about its axis, it may be prepared for right-hand manipulation.

With continued attention being directed to FIGS. 1 and 2 of the drawings, it will be observed that the axial disposition of the foot 18 is reversed in these two figures. This reversal provides the flexibility desired by the user in selecting a mounting point which permits the center of gravity of the system to more closely coincide with the balance point of the rod. Also, it permits the user to grasp the gripping handle of the rod at one of two alternate areas, one of which will normally provide a greater degree of comfort.

In order to prevent undesired or uncontrolled axial rotation of the reel during use, a protruding member such as an elongated key or ridge 21 is formed in the reel 12 along the rear surface thereof (FIG. 3), and a corresponding slot 22 is formed in the foot for receiving and accommodating the protruding member in the reel (FIG. 4). In this fashion, when the reel is fast on the mounting foot, undesired and uncontrolled rotation of the components is avoided. In some cases, it may be desirable to form a channel or recess in the rear surface of the reel, the channel being provided with protruding shoulders along the lateral edges thereof to hold the reel and handle in locked relationship, one to the other.

In order to control the height adjustment or elevation of the reel from the rod, a structure is provided, such as is shown in FIGS. 5 and 6, to accommodate the selection of one of a variety of heights. In this connection, a milled slot 25 is formed in the reel-attaching segment of the foot, and for purposes of locking the reel in a predetermined disposition on the reel-mounting means of the foot, projections such as the projection 26 may be formed in the rear surface of the reel, and corresponding detents 27—27 are formed in the foot structure. If desired, a serrated or saw-tooth configuration may be formed along the surface of the reel-attaching segment of the foot to receive the projections formed on the reel at any desired point. The detents 27—27 may be in the form of thru-bores, if desired, and spaced inwardly from the lateral edge of the surface of the mounting means. Also, right-hand and left-hand mounting may be accomplished by either centering the projections and the cooperating detents, or by providing matching projections or detents along either or both edges of the attaching surface of the reel and along both edges of the foot.

Particular attention is now directed to FIG. 7 of the drawings wherein a modified form of foot is shown. In this structure, the reel generally designated 30 is mounted on foot member generally designated 31, foot 31 including a shoe 32 with a forward tang 33 and a rear tang 34, along with a shank including a lower segment 35 and an upper segment 36. Bayonet coupling clamp 37 is utilized to join segments 35 and 36 together, and is symmetrical about its horizontal axis so as to permit either forward or rearward facing of the reel 30. The arrow 38 illustrates this feature. In this structure, therefore, the reel-mounting means is provided as at 39, this mounting means preferably being in the form of the threaded mounting screw 39. As has been indicated in connection with the devices shown in FIGS. 4 and 5, means are provided for preventing uncontrolled axial rotation of the reel 30 relative to the mounting foot 31.

Attention is now directed to FIG. 8 of the drawings wherein a reel generally designated 40 is shown mounted on a mounting foot generally designated 41. Mounting foot 41 includes a mounting shoe member 42 having a forward tang 43 and a rearward tang 44, the structure also having a mounting means as at 45 which includes an internally threaded locking nut 46 fitting on a projecting threaded shank secured to the reel.

Attention is now directed to FIGS. 9, 10 and 11 of the drawings wherein a modified form of reel is illustrated. In these figures, the reel generally designated 50 is provided with a rear surface 51 having a raised or dovetailed area 52 disposed around and about the threaded bore 53. Bore 53 is adapted to receive the mounting screw, the mounting foot being of the type shown in FIG. 12.

The arrangement of the raised dovetail portion about the bore 53 accommodates axial rotation of the reel member 50 relative to the mounting foot, in order to accommodate either right-hand or left-hand mounting. In other words, the dovetail portion 52 is arranged symmetrically about threaded bore 53.

Attention is now directed to FIG. 12 of the drawings wherein a mounting foot generally designated 60 is shown, this foot having a reel mating surface 61 provided with a plurality of bore areas such as at 62. These bores are spaced apart along their centers at a distance sufficient to provide the fluted or serrated members 63 which will be adequate to permit controlled elevational mounting of the reel on the foot, this being achieved without disturbing the other features of the structure.

It is observed that mounting foot 60 is provided with a tilting arrangement such as at 64, the tilting arrangement including a thru-bolt or screw 65, which couples the mounting means portion of foot 60, such as at 66, to the base portion or segment 67.

The tilting feature of the structure permits the user to adjust the line axis to the center axis of the line guides, thus eliminating the scuffing action which occurs between the line and the circumference of the first line guide, when casting. It is desirable that a modest amount of adjustment be necessary, and for most purposes, a total of between about 10° and 15° will prove to be adequate.

It will be appreciated that various attaching schemes may be utilized to secure the reel to the rod, and also various techniques may be utilized to accommodate axial rotation of the reel relative to the mounting foot.

If desired, a family of mounting feet may be provided with varying degrees of "pitch" along the shank portions in order to expand the mounting alternatives available for the user. The varying degrees of pitch available in such a family will permit the user to more carefully control the axial mounting location of the reel upon the rod which he selects.

Feet may be prepared from metal, plastic, or other materials of construction, a plastic molded structure being economically and advantageously employed. Since the mounting foot is one of the more frequently damaged components of a fishing reel, the concept of the present invention enables the user to merely replace this component without suffering the need to obtain an entirely new frame assembly.

It will be appreciated that other mounting techniques may be employed, such as, for example, the use of a pair of mounting screws 20 symmetrically disposed so as to permit alternate mounting of a reel on the surface of the reel mounting means for either right-hand or left-hand manipulation. In lieu of the screw member 20, bayonet locking means may be arranged along the surface of said reel mounting means, these locking means mating with cooperating locking means attached to the reel body for accomplishing attachment of the reel to the mounting foot means. Also, cam locking attachment schemes may be employed in this regard as well.

What is claimed is:

1. In combination with a fishing reel means for dispensing and re-winding fishing line and having winding means for actuation thereof, a mounting foot means comprising:
    a. a central mounting shank portion with shoe means at one end thereof having tips extending from the juncture with said central mounting shank for attachment to the reel mounting portion of a fishing rod handle, and bi-directionally oriented reel-mounting means having a point of attachment for a reel and being disposed adjacent the opposed end of said mounting foot means for the attachment to the body of a fishing reel in either of two mounting dispositions arcuately spaced 180°, one from the other;
    b. said mounting shank portion having a segment with its axis angularly offset from the axis of said shoe means for controlling the axial disposition of a fishing reel attached to said reel-mounting means; and
    c. means in combination with said bi-directionally oriented reel-mounting means for controllably adjusting and rigidly fixing the disposition of said reel upon said mounting foot means relative to said fishing rod handle.

2. The combination as defined in claim 1 being particularly characterized in that said reel is secured to said mounting foot by means of mounting attachment means disposed along said reel mounting means and being arranged for locking engagement with said reel.

3. In combination with a fishing reel means for dispensing and re-winding fishing line and having winding means for actuation thereof, a mounting foot means comprising:
    a. a central mounting shank portion with shoe means at one end thereof having generally symmetrically disposed tips extending from the juncture with said central mounting shank for attachment to the reel-mounting portion of a fishing rod handle, and reel-mounting means adjacent the opposed end of said mounting foot means and having a pair of oppositely disposed reel mounting faces thereon, and means for the attachment of either face thereof to the body of a fishing reel;
    b. said mounting shank portion having a segment with its axis angularly offset from the axis of said shoe means for controlling the axial disposition of a fishing reel attached to said reel mounting means; and
    c. means in combination with said bi-directionally oriented reel mounting means for controllably adjusting the rigidly fixing the disposition of said reel upon said mounting foot means relative to said fishing rod handle.

4. In combination with fishing reel means for dispensing and re-winding fishing line and having means for manipulation and operation thereof, a mounting foot means comprising:
    a. a central mounting shank with shoe means at one end thereof having generally symmetrically extending tangs for attaching the foot to the mounting segment of a fishing rod handle, and reel-mounting means adjacent the opposed end of said central mounting shank and having a pair of oppositely disposed reel-mounting faces thereon, and means for the attachment of either face thereof to the body of said spinning reel means;
    b. said mounting shank and said shoe means presenting an asymmetrical disposition for said reel mounting means along the axial extent of a fishing rod handle to determine the axial disposition of said reel means along a fishing rod to which said mounting foot is attached; and
    c. means in combination with said bi-directionally oriented reel mounting means for controllably adjusting and rigidly fixing the disposition of said reel upon said mounting foot means relative to said fishing rod handle.

5. The combination as defined in claim 4 being particularly characterized in that rigid alignment means are provided for resisting relative rotation of said reel means and said mounting foot means.

6. The combination as defined in claim 5 being particularly characterized in that said alignment means comprises a projection formed on the body of a fishing reel adapted to mate with a recess formed in said reel-mounting means.

7. The combination as defined in claim 6 being particularly characterized in that said projection is a generally longitudinally extending key disposed centrally along the mounting surface of said reel, and said recess is a keyway formed in said reel-mounting means.

8. The combination as defined in claim 4 being particularly characterized in that said reel is secured to said mounting foot by means of mounting screw means passing through said reel-mounting means and being threadedly engaged in said reel.

9. In combination with a fishing reel means for dispensing and re-winding fishing line and having winding means for actuation thereof, a mounting foot means comprising:
    a. a central mounting shank portion with shoe means at one end thereof having tips extending from the juncture with said central mounting shank for attachment to the reel mounting portion of a fishing rod handle, and bi-directionally oriented reel-mounting means having a point of attachment for a reel and being disposed adjacent the opposed end of said mounting foot means for the attachment to the body of a fishing reel in either of two mounting dispositions arcuately spaced 180°one from the other;
    b. said mounting shank portion having a segment with its axis angularly offset from the axis of said shoe means for controlling the axial disposition of a fishing reel attached to said reel-mounting means, and means being provided for adjusting the spacing of the point of attachment for said fishing reel means from said shoe means.

10. The combination as defined in claim 9 being particularly characterized in that said adjusting means comprises an elongated slot formed in said reel-mounting means.

11. In combination with a fishing reel means for dispensing and re-winding fishing line and having winding means for actuation thereof, a mounting foot means comprising:
    a. a central mounting shank portion with shoe means at one end thereof having tips extending from the juncture with said central mounting shank for attachment to the reel mounting portion of a fishing rod handle, and bi-directionally oriented reel-mounting means having a point of attachment for a reel and being disposed adjacent the opposed end of said mounting foot means for the attachment to the body of a fishing reel in either of two mounting dispositions arcuately spaced 180°, one from the other;

b. said mounting shank portion having a segment with its axis angularly offset from the axis of said shoe means for controlling the axial disposition of a fishing reel attached to said reel-mounting means, and means being formed along said central shank permitting angular pivotal motion of said reel-mounting means relative to said shoe means.

12. In combination with a fishing reel means for dispensing and re-winding fishing line and having winding means for actuation thereof, a mounting foot means comprising:

a. a central mounting shank portion with shoe means at one end thereof having generally symmetrically disposed tips extending from the juncture with said central mounting shank for attachment to the reel-mounting portion of a fishing rod handle, and reel-mounting means adjacent the opposed end of said mounting foot means and having a pair of oppositely disposed reel-mounting faces thereon, and means for the attachment of either face thereof to the body of a fishing reel;

b. said mounting shank portion having a segment with its axis angularly offset from the axis of said shoe means for controlling the axial disposition of a fishing reel attached to said reel-mounting means, and means being provided for adjusting the spacing of the point of attachment for said fishing reel means from said shoe means.

13. In combination with a fishing reel means for dispensing and re-winding fishing line and having winding means for actuation thereof, a mounting foot means comprising:

a. a central mounting shank portion with shoe means at one end thereof having generally symmetrically disposed tips extending from the juncture with said central mounting shank for attachment to the reel-mounting portion of a fishing rod handle, and reel-mounting means adjacent the opposed end of said mounting foot means and having a pair of oppositely disposed reel-mounting faces thereon, and means for the attachment of either face thereof to the body of a fishing reel;

b. said mounting shank portion having a segment with its axis angularly offset from the axis of said shoe means for controlling the axial disposition of a fishing reel attached to said reel-mounting means, and means being formed along said central shank permitting angular pivotal motion of said reel-mounting means relative to said shoe means.

14. In combination with fishing reel means for dispensing and re-winding fishing line and having means for manipulation and operation thereof, a mounting foot means comprising:

a. a central mounting shank with shoe means at one end thereof having generally symmetrically extending tangs for attaching the foot to the mounting segment of a fishing rod handle, and reel-mounting means adjacent the opposed end of said central mounting shank and having a pair of oppositely disposed reel-mounting faces thereon, and means for the attachment of either face thereof to the body of said spinning reel means;

b. said mounting shank and said shoe means presenting an asymmetrical disposition for said reel-mounting means along the axial extent of a fishing rod handle to determine the axial disposition of said reel means along a fishing rod to which said mounting foot is attached; and c. said reel-mounting means being adapted to receive a reel in either of two oppositely disposed reel-mounting positions with the reel structure being shifted 180° upon an axis thereof from one mounting disposition to a second mounting disposition for pre-selection of right-hand and left-hand operation of said fishing reel.

15. In combination with fishing reel means for dispensing and re-winding fishing line and having means for manipulation and operation thereof, a mounting foot means comprising:

a. a central mounting shank with shoe means at one end thereof having generally symmetrically extending tangs for attaching the foot to the mounting segment of a fishing rod handle, and reel-mounting means adjacent the opposed end of said central mounting shank and having a pair of oppositely disposed reel-mounting faces thereon, and means for the attachment of either face thereof to the body of said spinning reel means;

b. said mounting shank and said shoe means presenting an asymmetrical disposition for said reel-mounting means along the axial extent of a fishing rod handle to determine the axial disposition of said reel means along a fishing rod to which said mounting foot is attached;

c. rigid alignment means being provided for resisting relative rotation of said reel means and said mounting foot means, said alignment means comprising a projection formed on the body of a fishing reel adapted to mate with a recess formed in said reel-mounting means, said reel-mounting means having a screw-receiving slot formed therein extending centrally along the axis thereof, and a plurality of recesses for alternate reception of said reel body projection.

* * * * *